(No Model.)  3 Sheets—Sheet 1.

G. W. WHITE.
COMBINED SEEDER AND FERTILIZER DISTRIBUTER.

No. 298,644. Patented May 13, 1884.

(No Model.) 3 Sheets—Sheet 2.
G. W. WHITE.
COMBINED SEEDER AND FERTILIZER DISTRIBUTER.
No. 298,644. Patented May 13, 1884.
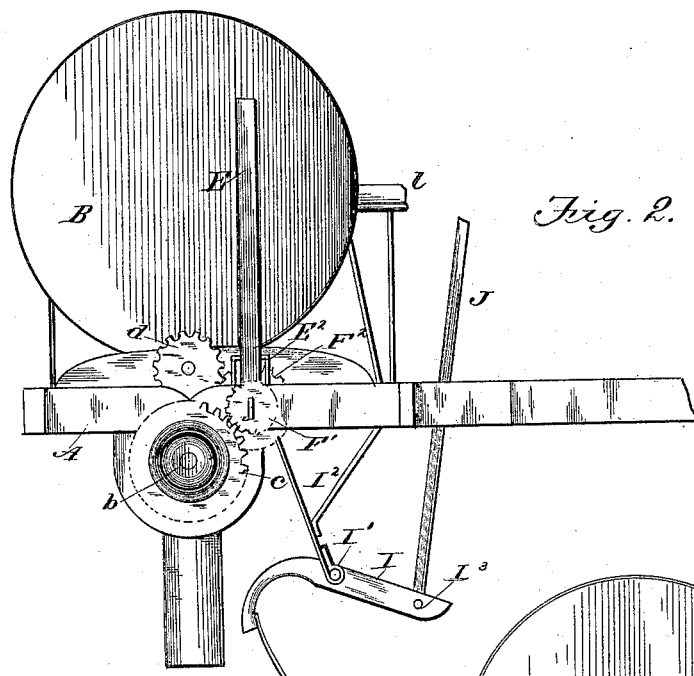
Fig. 2.
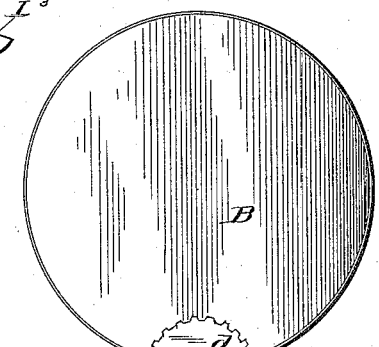
Fig. 3.
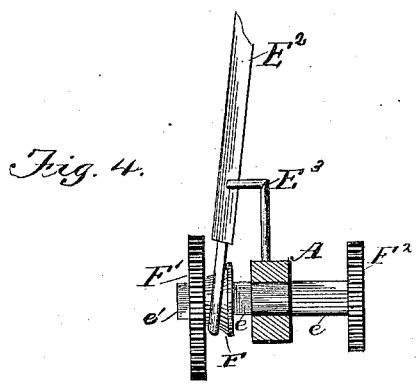
Fig. 4.
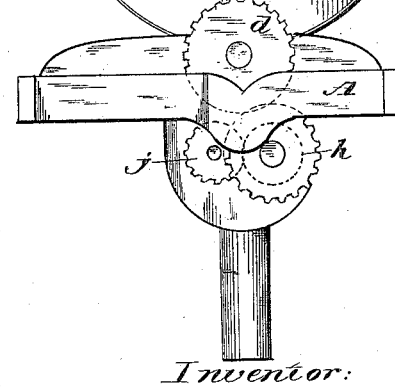
Witnesses:
Wm. Duvall
H. Burkhard
Inventor:
George W. White,
per Edson Bro's
Attorneys
N. PETERS. Photo-Lithographer. Washington, D. C.

(No Model.)   3 Sheets—Sheet 3.

G. W. WHITE.
COMBINED SEEDER AND FERTILIZER DISTRIBUTER.

No. 298,644. Patented May 13, 1884.

Witnesses:   Inventor:
George W. White,
per Edson Bros,
Attorneys.

UNITED STATES PATENT OFFICE.

GEORGE WASHINGTON WHITE, OF BELLE MINA, ALABAMA.

COMBINED SEEDER AND FERTILIZER-DISTRIBUTER.

SPECIFICATION forming part of Letters Patent No. 298,644, dated May 13, 1884.

Application filed November 16, 1883. (No model.)

*To all whom it may concern:*

Be it known that I, GEORGE W. WHITE, a citizen of the United States, residing at Belle Mina, in the county of Limestone and State of Alabama, have invented certain new and useful Improvements in Combined Seeder and Fertilizer-Distributer; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to improvements in fertilizer-distributers, having for its object to effect the proper distribution of the fertilizer, together with the comminution of the same; and it consists of the several hereinafter described and claimed combinations and arrangements of parts adapted to carry out the aforesaid objects.

Figure 1:
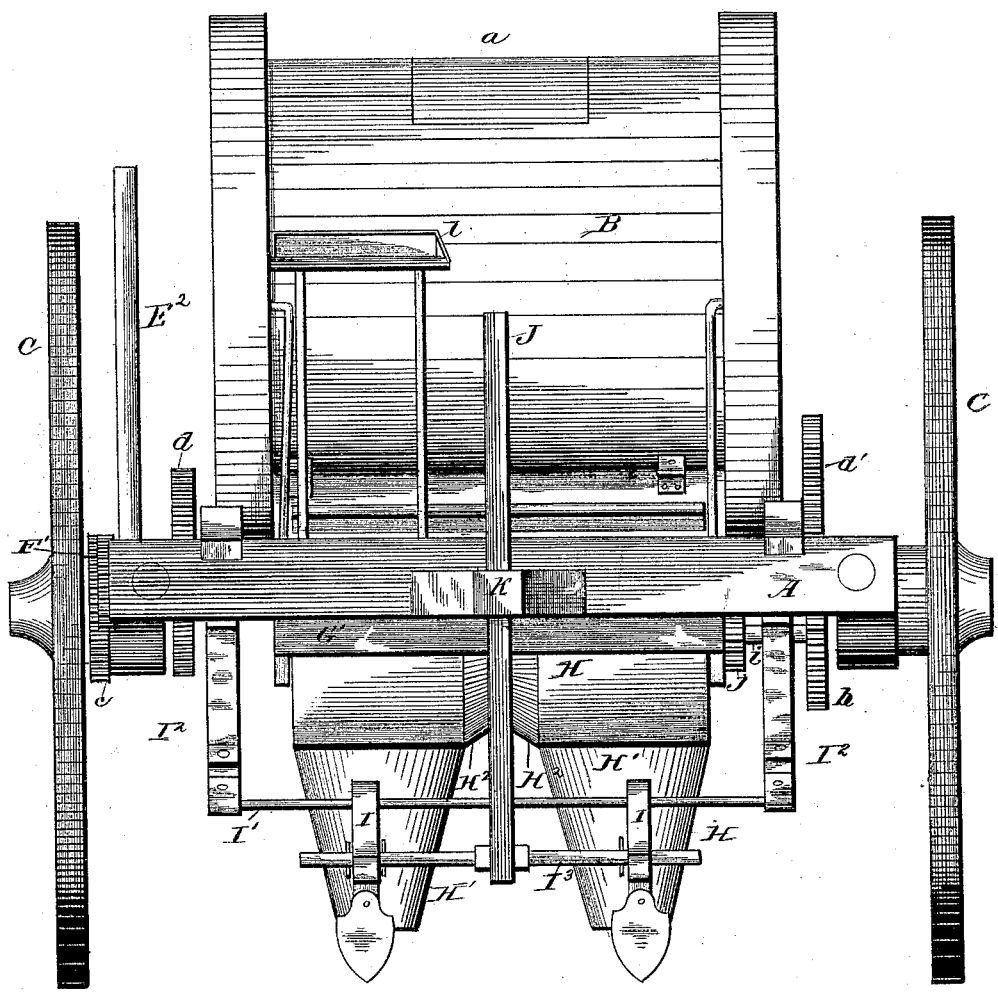
Figure 6:
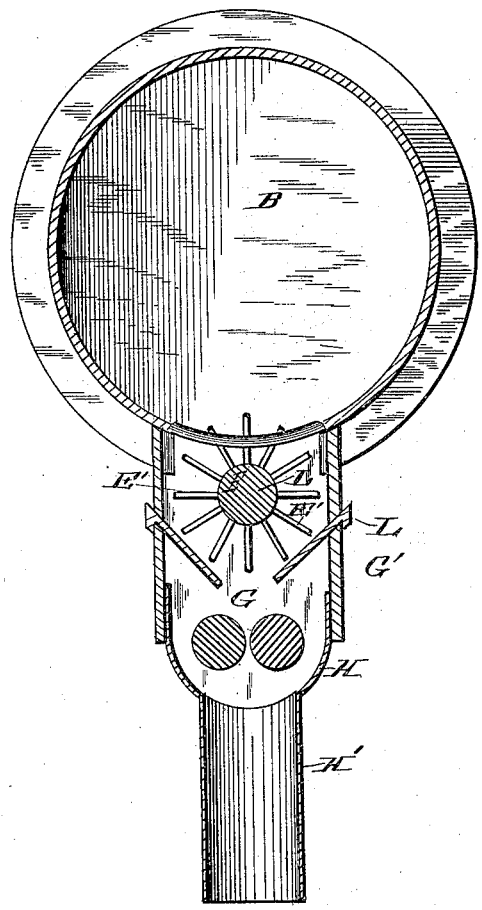
Figure 5:
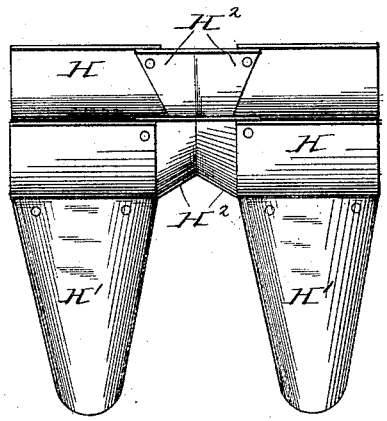

In the accompanying drawings, Figure 1 is a front elevation of my improved fertilizer. Figs. 2 and 3 are opposite side elevations, with parts removed, of the same somewhat reduced. Fig. 4 is a detail view thereof. Fig. 5 is a cross-sectional elevation of the machine, and Fig. 6 is an additional detail view thereof.

In the organization of my invention I mount upon a suitable frame, A, a hopper, B, preferably of cylindrical form, with an opening in its upper side, through which it is filled with the desired kind of fertilizer, and which opening is provided with a door, $a$, said cylinder or hopper also having a longitudinal opening in its bottom, through which the fertilizer is permitted to escape therefrom. The frame A itself is mounted upon end axles, $b$, having wheels C C, one of whose hubs is provided with a toothed wheel or pinion, $c$, fixed thereto, the function of which will be presently seen.

E is the fertilizer-agitator, which consists of a shaft provided with a series of radial arms, E', and supported in the ends of inclosure G', said agitator being arranged in a vertical plane passing through the bottom opening of the hopper to effect the feeding of the fertilizer through said opening. The shaft of the agitator E is provided outside of the hopper with pinions $d\ d'$, one on each end.

F is a sleeve or hollow shaft, which is adapted to be slid on a supplementary shaft, $e$, journaled in the frame A, and which hollow shaft or sleeve is provided with a pinion, F', and an angular or oblong bore, while the supplementary shaft is provided with a second pinion, F², on its opposite end, and with a corresponding angular surface, $e$, at one end to effect the coupling of the said pinion F' therewith when it is desired to cause the engagement of said pinion with the pinion $c$ of one of the driving-wheels C. The shifting or sliding of the sleeve F, to effect the aforesaid coupling of parts, is accomplished by the movement of a lever, E², pivoted upon a staple-shaped bracket, E³, secured to the frame A, as seen in Fig. 4, the lower end of said lever being forked and embracing the sleeve F, which has a shoulder at its free end to confine the lever thereon, while the upper end of said lever is within convenient or easy reach of the operator. The pinion $d'$ on the opposite end of the agitator-shaft is caused to engage with a pinion, $h$, on the shaft $i$ of one of the comminuting-rolls G, which are arranged only a slight distance apart and supported in a chamber or inclosure, G', immediately below the hopper. The shafts of the said rolls are provided with intergearing pinions $j\ h$, to effect their coaction. When the pinions $c$ and F' are brought into engagement with each other, the pinion F² on the inner end of the shaft $e$ is caused to engage with the pinion $d$ of the agitator-shaft, and thus transmit motion to the agitator, which in turn transmits motion through the pinion $d'$ on the opposite end of its shaft to the pinion $h$ and the pinions $j$ of the pulverizer or comminutor rolls. The inclosure G' is suitably fastened within the frame A, and to it are so pivoted or connected the upper semicircular portions, H, of the chutes or spouts H', through which the fertilizer is conducted in separate quantities to the ground, that the inner telescoping tapered ends, H², thereof can be so adjusted as to permit the lower ends of said spouts to be moved nearer together or farther apart, as may be desired in the distribution of the fertilizer.

I I are the shovel standards or beams, which are pivoted about their centers upon a common axis, I', supported in brackets I², fastened to and depending from the frame A. The forward ends of said plow-beams are connected to a common rod or bar, I³, under the control of a lever, J, connected thereto, and extending upwardly through a keeper, k, secured to the front end of the frame A, the upper end of said lever being disposed within convenient reach of the operator, who occupies the seat l, to permit the raising and lowering of the shovel standards or beams. Said seat is mounted upon metallic rods or other strong supports connected to the frame A.

Deflectors or inclined plates L are inserted through the sides of the inclosure G, to conduct the fertilizer to and between the comminuting-rolls.

I have described my device as a distributer of fertilizers; but it is obvious that it can be used as a seed-planter.

I am aware that changes in the form and proportion of parts composing my invention can be made without departing from the principle or sacrificing the advantages thereof. I would have it understood that I do not limit myself to the exact construction herein shown and described, but hold myself at liberty to make such changes and alterations as fairly fall within the scope of my invention.

Having thus fully described my invention, what I claim, and desire to secure by Letters Patent, is—

1. In a fertilizer-distributer, the combination, with the agitator, with its shaft provided with a pinion, of the driving-wheel having a pinion, the supplementary shaft having at one end a pinion and at its other end an angular surface, the sliding sleeve having an angular bore and a pinion, and the shifting-lever, substantially as and for the purpose set forth.

2. In a fertilizer-distributer, the combination, with the agitator, with its shaft provided with pinions at both ends, and the comminuting or pulverizing rolls, with their shafts provided with intergearing pinions and a separate pinion gearing with one of the pinions of the agitator-shaft, of the supplementary shaft having a pinion at one end and an angular surface at its other end, and a sliding sleeve having a pinion and an angular bore, substantially as and for the purpose set forth.

3. In a fertilizer-distributer, the combination, with the comminuting-roll case affixed to the machine-frame, of the spouts with their upper semicircular portions pivoted and provided with tapering telescoped sections, substantially as and for the purpose set forth.

In testimony whereof I affix my signature in presence of two witnesses.

GEORGE WASHINGTON WHITE.

Witnesses:
J. A. B. LOVETT,
W. W. SANDERS.